United States Patent [19]

Ogino et al.

[11] Patent Number: 5,489,671
[45] Date of Patent: Feb. 6, 1996

[54] TRISAZO COMPOUND IMPARTING BLACK COLOR, METHOD FOR DYEING BY USING IT AND INK CONTAINING IT

[75] Inventors: Kazuya Ogino, Minoo; Yuriko Tamura, Ibaraki; Takashi Omura, Kobe; Mahito Fujita, Ibaraki; Hideo Kawashita, Minoo; Koji Aburada, Sumiyoshi, all of Japan

[73] Assignee: Sumitomo Chemical Company, Limited, Osaka, Japan

[21] Appl. No.: 313,642

[22] Filed: Sep. 27, 1994

[30] Foreign Application Priority Data

Sep. 28, 1993 [JP] Japan .................... 5-241285

[51] Int. Cl.$^6$ .................... C09B 35/46; C09D 11/02; D21H 21/28
[52] U.S. Cl. .................... 534/664; 534/680; 534/686; 534/796; 8/437; 8/681; 8/918; 8/919; 106/22 K
[58] Field of Search ................. 534/664, 680, 534/686, 796

[56] References Cited

U.S. PATENT DOCUMENTS

| | | | |
|---|---|---|---|
| 4,295,889 | 10/1981 | Eida et al. | 106/22 K |
| 4,479,906 | 10/1984 | Zeidler et al. | 534/680 |
| 4,767,459 | 8/1988 | Greenwood et al. | 106/22 K |
| 5,110,917 | 5/1992 | Bauer et al. | 534/815 |

FOREIGN PATENT DOCUMENTS

| | | |
|---|---|---|
| 348050 | 12/1989 | European Pat. Off. . |
| 943662 | 5/1956 | Germany . |
| 61-18947 | 5/1986 | Japan . |
| 63-105079 | 5/1988 | Japan . |
| 64-79276 | 3/1989 | Japan . |
| 4-288371 | 10/1992 | Japan . |
| 4-363363 | 12/1992 | Japan . |
| 5-246977 | 9/1993 | Japan . |

OTHER PUBLICATIONS

*Chemical Abstracts*, vol. 109, 1988, abstract No. 109:94918z, David Greenwood, "Jet printing ink".
*Chemical Abstracts*, abstract no. 111:196993d, "Waterproof and light- and feathering-resistant inks for jet-printing", Suga, Juko; Sakaeda, Takeshi; Shirota, Katsuhiro (Canon K.K.), Jpn. Kokai Tokkyo Koho JP 01 79,276 [89 79,276] (1988).

Primary Examiner—Johann Richter
Assistant Examiner—Fiona T. Powers
Attorney, Agent, or Firm—Stevens, Davis, Miller & Mosher

[57] ABSTRACT

A trisazo compound represented by the following formula (1) in the free acid form:

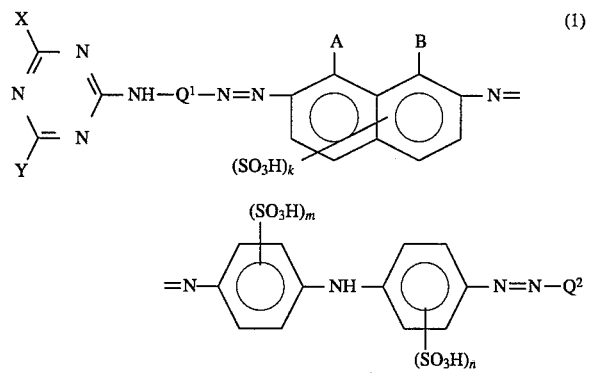

wherein Q' is phenylene group, $Q^2$ is phenyl or naphtyl group, one of the A and B is a hydroxy group and the other is an amino group, K is 1 or 2, one of m and n is 1 and the other is 0, X and Y independently of one another are each —$OR^1$, —$SR^2$, —$NR^3R^4$ or

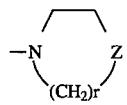

wherein $R^1$, $R^2$, $R^3$ and $R^4$ independently of one another are each a hydrogen atom, an alkyl, phenyl or naphtyl group; r is 1 or 2; and Z is —$CH_2$—, —O—, —$SO_2$— or —$NR^5$— wherein $R^5$ is a hydrogen atom or $C_1$–$C_4$ alkyl group;

a method for dyeing fiber material, paper or leather by using the trisazo compound;

and an ink which contains the trisazo compound and which is excellent in storage stability and can give a clear black printed image having excellent water resistance and light fastness.

15 Claims, No Drawings

TRISAZO COMPOUND IMPARTING BLACK COLOR, METHOD FOR DYEING BY USING IT AND INK CONTAINING IT

The present invention relates to a trisazo compound, a method for dyeing fiber material, paper or leather by using the trisazo compound and an ink containing the trisazo compound.

Polyazo direct or acid dyes produced from benzidine or its derivatives have hitherto been used for dyeing fiber materials having a hydroxy or amino group. However, production of benzidine used as a starting material of these dyes is prohibited, and benzidine derivatives exemplified by o-tolidine and dianisidine are resistered as special chemical substances of which handling is restricted in production of these dyes, because of their toxicity. For such a reason, a variety of compounds have been proposed as non-benzidine type dyes. However, none of them has yet satisfied the requirements of users in the dyeabilities.

C.I. Direct Black 168 represented by the following formula is also a dye proposed as a non-benzidine type dye.

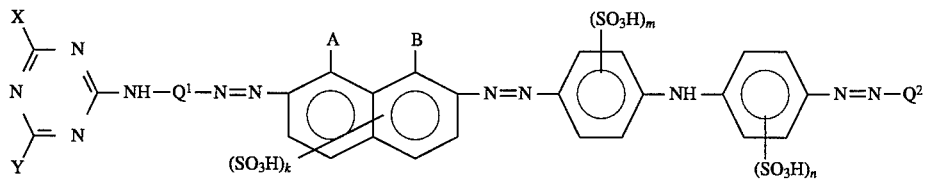

Ink containing the dye is mentioned in JP-A-63-105079 ("JP-A-" means Japanese-Unexamined Patent Publication i.e. "Kokai"). However, for dyeing fiber materials or paper, it cannot give a deep black color image because of, for example, inferiority in build-up property. Further, it is unsatisfactory in solubility as a dye for an ink and it gives a recording image having insufficient water resistance. Particularly when used as an ink for the ink jet-process, it often causes clogging of the nozzle due to deposition of dye and gives a recording image having insufficient water resistance. Thus, it is unsatisfactory from the view point of performances in any uses.

This is the object of the present invention to provide a compound capable of satisfying the necessary conditions of a dye for an ink which compound is producible without using benzidine nor derivatives thereof as a starting material. This object is achieved by the present invention.

The present invention provides a trisazo compound represented by the following formula(1) in the free acid form:

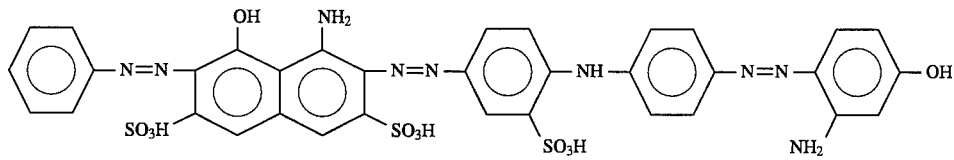 (1)

wherein $Q^1$ is phenylene group which may be optionally substituted by a substituent mentioned below; $Q^2$ is phenyl or naphtyl group which may be optionally substituted by a substituent such as mentioned below; one of A and B is a hydroxy group and the other is an amino group.; k is 1 or 2; one of m and n is 1 and the other is 0; X and Y independently of one another are each $-OR^1$, $-SR^2$, $-NH^3R^4$ or

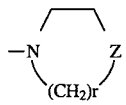

wherein $R^1$, $R^2$, $R^3$ and $R^4$ independently of one another are each a hydrogen atom, an alkyl, phenyl or naphthyl group which may be optionally substituted by a substituent such as mentioned below; r is 1 or 2; and Z is $-CH_2-$, $-O-$, $-SO_2-$ or $-NR^5-$ wherein $R^5$ is a hydrogen atom or $C_1-C_4$ alkyl group.

The present invention also provides a method for dyeing fiber material, paper or leather by using the trisazo compound of the formula(1) and an ink containing the trisazo compound.

$Q^1$ in the formula(1) is a phenylene group which may be optionally substituted. Preferably, $Q^1$ is an unsubstituted phenylene group or a phenylene group substituted by an alkyl, alkoxy, sulfo or carboxy group, which is represented by the following formula(2);

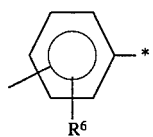 (2)

wherein $R^6$ is a hydrogen atom or an alkyl, alkoxy, sulfo or carboxy group and * means that the bond links to the azo group. The alkyl or alkoxy group denoted as $R^6$ is usually a lower alkyl or alkoxy group having 1–4 carbon atoms, respectively. Preferably, the alkyl or alkoxy group denoted as $R^6$ is an alkyl or alkoxy group having 1–2 carbon atoms, respectively.

$Q^2$ in the formula(1) is a phenyl or naphthyl group which may be optionally substituted. Examples of groups which can be substituents of the phenyl or naphthyl group include an amino group which may be optionally substituted, a hydroxy, sulfo, alkyl, alkoxy and carboxy group. The alkyl or alkoxy group, as the substituent of the phenyl or naphthyl group, is usually a lower alkyl or alkoxy group having 1–4 carbon atoms, respectively. Preferably, the alkyl or alkoxy group as the substituent is an alkyl or alkoxy group having 1–2 carbon atoms, respectively. Examples of groups which can be substituents of the amino group as the substituent of the phenyl or naphthyl group, include a methyl, ethyl, hydroxyethyl, cyanoethyl, acetyl, carbamoyl, phenyl, sulfophenyl, disulfophenyl and benzoyl group. The alkyl or alkoxy group, as the substituent of the amino group, is usually a lower alkyl or alkoxy group having 1–4 carbon atoms, respectively, preferably, the alkyl or alkoxy group having 1–2 carbon atoms, respectively.

When $Q^2$ in the formula(1) is a phenyl group, following ① or ② is preferable.

① A phenyl group which is substituted by one, two or three hydroxy groups and may be further substituted by an amino group which may be optionally substituted, a sulfo, alkyl, alkoxy or carboxy group.

② A phenyl group which is substituted by one or two amino groups which may be optionally substituted, and may be further substituted by a hydroxy, sulfo, alkyl, alkoxy or carboxy group.

The amino group as a substituent of the phenyl group may be unsubstituted, mono-substituted or disubstituted. Examples of the subusitituents of the amino group which is the substituent of the phenyl group include methyl, ethyl, hydroxyethyl, cyanoethyl, acetyl and carbamoyl. As examples of the alkyl or alkoxy group as subustituent of the phenyl group, methyl, ethyl, methoxy or ethoxy can be mentioned.

Among the phenyl groups denoted by $Q^2$ in the formula(1), particularly preferable is 2-amino-4-hydroxyphenyl or 2-hydroxy-4-aminophenyl.

When $Q^2$ in the formula(1) is a naphthyl group, following ③ or ④ is preferable.

③ A naphthyl group which is substituted by one or two hydroxy groups and may be further substituted by an amino group which may be optionally substituted, a sulfo or carboxy group.

④ A naphthyl group which is substituted by one or two amino groups which may be optionally substituted and may be further substituted by a hydroxy, sulfo or carboxy group.

Examples of the substituent of the amino group in the case of above ③ include methyl, acetyl, phenyl, sulfophenyl, disulfophenyl and benzoyl. Examples of the substituent of the amine group in the case of above ④ include methyl, ethyl, hydroxyethyl, cyanoethyl, acetyl and carbamoyl.

X and Y in the formula(1) independently of one another are each $-OR^1$, $-SR^2$, $-NR^3R^4$ or

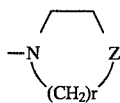

wherein $R^1$, $R^2$, $R^3$ and $R^4$ independently of one another are each a hydrogen atom, an alkyl, phenyl or naphthyl group which may be optionally substituted. The alkyl group denoted by $R^1$, $R^2$, $R^3$ or $R^4$, for example, may be an alkyl group having about 1–6 carbon atoms, and usually an alkyl group having about 1–4 carbon atoms is preferable.

Examples of the groups which can be the substituents of the alkyl group denoted by $R^1$, $R^2$, $R^3$ or $R^4$ include a lower alkoxy, sulfo, carboxy, hydroxy, halogen, phenyl, substituted phenyl, cyano, substituted amino and lower alkanoyl group. Examples of the substituted phenyl include halophenyl, lower alkyl phenyl and sulfophenyl. Examples of the substituted amine include mono-lower alkyl amino and di-lower alkylamino.

Examples of the groups which can be the substituents of the phenyl group denoted by $R^1$, $R^2$, $R^3$ or $R^4$ include a lower alkyl, lower alkoxy, sulfo, carboxy, halogen, sulfo lower alkyl and hydroxy group.

Examples of the groups which can be the substituents of the naphthyl group denoted by $R^1$, $R^2$, $R^3$ or $R^4$ include a sulfo group.

Preferably, X and Y independently of one another are each $-OR^1$ or $-NR^3R^4$. More preferably, X and Y independently of one another are each $-OR^{11}$ or $-NR^{31}R^{41}$ wherein $R^{11}$ is an unsubstituted alkyl group having 1–4 carbon atoms; an alkyl group having 1–4 carbon atoms which is substituted by one or two substituents selected from alkoxy having 1–4 carbon atoms, sulfo, carboxy, hydroxy, phenyl, cyano and chloro; an unsubstituted phenyl group; or a phenyl group which is substituted by one or two substituents selected from alkyl having 1–4 carbon atoms, alkoxy having 1–4 carbon atoms, sulfo, carboxy and chloro; and $R^{31}$ and $R^{41}$ independently of one another are each a hydrogen atom; an unsubstituted alkyl group having 1–4 carbon atoms; an alkyl group having 1–4 carbon atoms which is substituted by one or two substituents selected from amino substituted by two alkyl groups having 1–4 carbon atom, alkoxy having 1–4 carbon atoms, sulfo, carboxy and hydroxy; an unsubstituted phenyl group; or a phenyl group which is substituted by one or two substituents selected from alkyl having 1–4 carbon atoms, alkoxy having 1–4 carbon atoms, sulfo, carboxy and chloro.

Preferable combinations of X and Y are described, in more detail, as following ①–⑩:

① X is $-NR^{32}R^{42}$ wherein $R^{32}$ and $R^{42}$ independently of one another are each a hydrogen atom; or an alkyl group having 1–4 carbon atoms Which may be substituted by one or two substituents selected from amino substituted by two alkyl groups having 1–4 carbon atoms, alkoxy having 1–4 carbon atoms, sulfo, carboxy and hydroxy; and Y is $-NR^{33}R^{43}$ wherein $R^{33}$ and $R^{43}$ independently of one another are each a hydrogen atom; or a phenyl group which may be substituted by one or two substituents selected from alkyl having 1–4 carbon atoms, alkoxy having 1–4 carbon atoms, sulfo, carboxy and chloro;

② X and Y independently of one another are each $-NR^{32}R^{42}$ wherein $R^{32}$ and $R^{42}$ are as defined above;

③ X and Y independently of one another are each $-NR^{33}R^{43}$ wherein $R^{33}$ and $R^{43}$ are as defined above;

④ X is $-OR^{12}$ wherein $R^{12}$ is an alkyl group having 1–4 carbon atoms which may be substituted by one or two substituents selected from alkoxy having 1–4 carbon atoms, sulfo, carboxy, hydroxy, phenyl, cyano and chloro; and Y is $-OR^{13}$ wherein $R^{13}$ is a phenyl group which may be substituted by one or two substituents selected from alkyl having 1–4 carbon atoms, alkoxy having 1–4 carbon atoms, sulfo, carboxy and chloro;

⑤ X and Y independently of one another are each $-OR^{12}$ wherein $R^{12}$ is as defined above;

⑥ X and Y independently of one another are each $-OR^{13}$ wherein $R^{13}$ is as defined above;

⑦ X is $-NR^{42}R^{42}$ wherein $R^{32}$ and $R^{42}$ are as defined above; and Y is $-OR^{12}$ wherein $R^{12}$ is as defined above;

⑧ X is $-NR^{32}R^{42}$ wherein $R^{32}$ and $R^{42}$ are as defined above; and Y is $-OR^{13}$ wherein $R^{13}$ is as defined above;

⑨ X is —NR³³R⁴³ wherein R³³ and R⁴³ are as defined above; and Y is —OR¹³ wherein R¹³ is as defined above;

⑩ X is —NR³³R⁴³ wherein R³³ and R⁴³ are as defined above; and Y is —OR¹² wherein R¹² is as defined above.

It is also preferred that at least one of X and Y is (a) an alkylamino group which has 1–4 carbon atoms and may be optionally substituted by one or two substituents selected from amino substituted by two alkyl groups having 1–4 carbon atoms, alkoxy having 1–4 carbon atoms, sulfo, carboxy and hydroxy or (b) a phenylamino group which may be optionally substituted by one or two substituents selected from alkyl having 1–4 carbon atoms, alkoxy having 1–4 carbon atoms, sulfo, carboxy and chloro.

It is particularly preferred in the present invention that at least one of X and Y is —NH(CH₂)₃N(C₂H₅)₂.

Among the trisazo compounds represented by the formula(1), a preferred compound is represented by the following formula(3) or (4) in the free acid form.

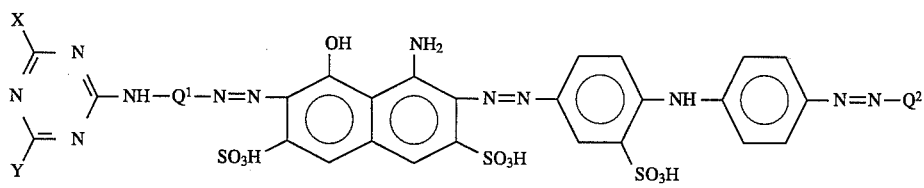

(3)

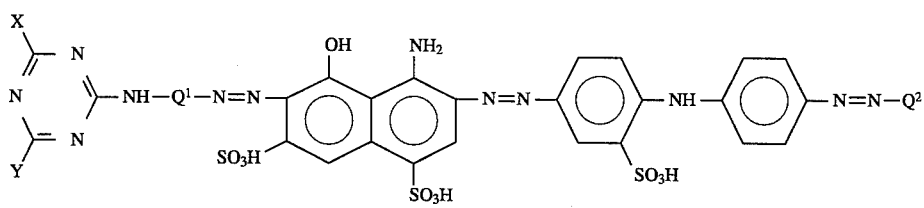

(4)

wherein Q¹, Q², X and Y are as defined above.

The trisazo compounds of the present invention are either in the form of the free acid or in the form of a salt thereof. Preferably, they are used in the form of an alkali metal salt, an ammonium salt or an organic amine salt. As examples of the alkali metal to form the alkali metal salt, lithium, sodium, potassium can be refered to. As examples of the organic amine to form the organic amine salt, monoethanolamine, diethanolamine, triethanolamine can be referred to.

The trisazo compounds represented by the formula (1) can be produced, for example, according to the following process.

An amine compound represented by the following formula(5);

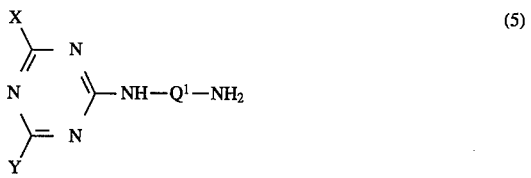

(5)

wherein X, Y and Q¹ are as defined above, is diazotized to obtain a diazonium compound(5–1).

A diaminodiphenylamine compound represented by the following formula(6) in the free acid form;

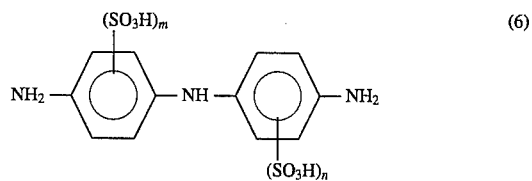

(6)

wherein m and n are as defined above, is tetrazotized to obtain a tetrazonium compound(6-1).

Then the diazonium compound(5-1), the tetrazonium compound(6-1), an aminonaphthol compound represented by the following formula(7) in the free acid form,

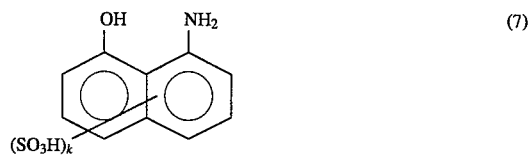

(7)

wherein k is as defined above and an aromatic compound represented by the following formula(8)

Q²—H                               (8)

wherein Q² is as defined above, are allowed to react so as to the diazonium compound(5-1) is coupled with the aminonaphthol compound of the formula(7) and so as to the tetrazonium compound(6-1) is coupled with the aminonaphthol compound of the formula(7) and the aromatic of the formula(8).

The amine compound represented by the formula(5) can be produced, for example, by a condensation reaction of 2,4,6-trihalogeno-s-triazine with one or two compounds selected from the compounds represented by the following formula

NH₂—Q¹—R⁷                         (5-a)

wherein Q¹ is as defined above and R⁷ is nitro, amino or acetylamino, and one or two compounds selected from the following compounds;

H—OR¹                             (5-b)

H—SR²                             (5-b)

H—NR³R⁴                           (5-d)

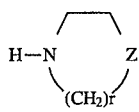

(5-e)

wherein $R^1$, $R^2$, $R^3$, $R^4$, Z and r are as defined above, followed by the hydrolysis or the reduction if $R^7$ is acetylamino or nitro.

The trisazo compound represented by the formula (1) wherein A is hydroxy and B is amino can be produced, for example, in the following manner ① or ②.

① A diaminodiphenylamine compound of the formula(6) is tetrazotized in a usual manner. Then the tetrazonium compound thus obtained is coupled with an aminonaphthol of the formula(7) in an aqueous medium under acidic conditions to obtain a monoazodiazonium compound. The monoazodiazonium compound thus obtained is coupled in a weakly acidic, neutral or weakly alkaline aqueous medium with a diazonium compound prepared by diazotizing the amine compound of the formula(5) in a usual manner. The resulting compound is coupled with the aromatic compound of the formula(8) in a weekly acidic, neutral or weekly alkaline aqueous medium to obtain the trisazo compound represented by the formula(1 ) wherein A is hydroxy group and B is amino.

② A diaminodiphenylamine compound of the formula(6 ) is tetrazotized in a usual manner, Then, the tetrazonium compound thus obtained is coupled with an aminonaphthol of the formula(7) in an aqueous medium under acidic conditions to obtain a monoazodiazonium compound. The monoazodiazonium compound thus obtained is coupled with an aromatic compound of the formula(8) in a weekly acidic, neutral or weekly alkaline aqueous medium to obtain a disazo compound. The resulting disazo compound is coupled in a weakly acidic, neutral or weakly alkaline aqueous medium with a diazonium compound prepared by diazotizing the amine compound of the formula(5) in a usual manner to obtain the trisazo coumpound represented by the formula(1 ) wherein A is hydroxy group and B is amino.

The trisazo compound represented by the formula (1) wherein A is amino and B is hydroxy can be produced, for example, in the following manner.

The amino compound of the formula(5) is diazotized in a usual manner and the resulting diazonium compound is coupled with an aminonaphthol compound of the formula(7) under acidic conditions in an aqueous medium to obtain a monoazo compuond. Then, the monoazo compuond is coupled in a weakly acidic, neutral or weakly alkaline aqueous medium with a tetrazonium coumpound prepared by tetrazotizing the diaminodiphenylamine compound represented by the formula(6) in a usual manner, The resulting compound is coupled with an aromatic compound of the formula (8) in a weakly acidic, neutral or weekly alkaline aqueous medium to obtain the trisazo coumpound represented by the formula(1) wherein A is amino and B is hydroxy.

Examples of the compounds of the formula(5-a) include 4-nitroaniline, 3-nitroaniline, 1-amino-4-acetylaminobenzene, 1-amino-3-acetylaminobenzene, 1-amino-2-methyl-5-nitrobenzene, 1-amino-2-methoxyl-4-nitrobenzene, 1-amino-2-methoxyl-5-nitrobenzene, 1,3-diaminobenzene-4-sulfonic acid, 1-amino-4-nitrobenzene-2-sulfonic acid, 2-carboxy-1,4-diaminobenzene and 1-amino-2-carboxy-4-acetylamilobenzene.

Examples of the compounds of the formula(5-b) include; an aromatic hydroxy compound such as phenol, 1-hydroxy-2-methylbenzene, 1-hydroxy-3-methylbenzene, 1-hydroxy-4-methylbenzene, 1-hydroxy-3,4-dimethylbenzene, 1-hydroxy-3,5-dimethylbenzene, 1-hydroxy-2-ethylbenzene, 1-hydroxy-3-ethylbenzene, 1-hydroxy-4-ethylbenzene, 1-hydroxy-2-methoxylbenzene, 1-hydroxy-3-methoxylbenzene, 1-hydroxy-4-methoxylbenzene, 1-hydroxy-2-ethoxylbenzene, 1-hydroxy-3-ethexylbenzene, 1-hydroxy-4-ethoxylbenzene, 1-hydroxy-2-chlorobenzene, 1-hydroxy-3-chlorobenzene, 1-hydroxy-4-chlorobenzene, 3-hydroxyphenylmethane sulfonic acid, 4-hydroxyphenylmethane sulfonic acid, 3-hydroxybenzene sulfonic acid, 4-hydroxybenzene sulfonic acid, 5-hydroxybenzene-1,3-disulfonic acid, 2-hydroxybenzene-1,4-disulfonic acid, 4-hydroxybenzene-1,2-disulfonic acid, 4-hydroxy-5 -methylbenzene-1,2-disulfonic acid, 3-hydroxybenzoic acid, 4-hydroxybenzoic acid, 5-hydroxybenzene-1,3-dicarboxylic acid, 5-hydroxy-2-ethoxybenzene sulfonic acid, 2-, 4-, 5-, 6-, 7- or 8-hydroxynaphthalene-1-sulfonic acid, 1-, 4-, 5-, 6-, 7- or 8-hydroxynaphthalene-2-sulfonic acid, 4-, 5-, 6-, 7- or 8-hydroxynaphthalene-1,3-disulfonic acid, 2-, 3- or 4-hydroxynaphthalene-1,5-disulfonic acid, 4- or 8 -hydroxynaphthalene-1,6-disulfonic acid, 4-hydroxynaphthalen e-1, 7-disulfonic acid, 3- or 4-hydroxynaphthalene-2,6-disulfonic acid, 3- or 4-hydroxynaphthalene-2,7-disulfonic acid, 6- or 7-hydroxynaphthalene-1,3,5-trisulfonic acid and 4-hydroxynaphthalene-1,3,6-trisulfonic acid; and an aliphatic hydroxy compound such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethane sulfonic acid, 3-hydroxy-1-propane sulfonic acid, 2-cyanoethanol, glycol acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethnol and 1-phenyl-2-propanol.

Compounds which are similar to the compounds mentioned above as examples of the compounds of formula(5-b), except that their hydroxy groups are replaced by mercapto groups can be mentioned as examples of the compounds of formula(5-c).

As examples of the compounds of the formula(5-d), the following can be mentioned; ammonia; aromatic amines such as 1-aminobenzene, 1-amino-2-methylbenzene, 1-amino-3-methylbenzene, 1-amino-4-methylbenzene, 1-amino-3,4-dimethylbenzene, 1-amino-3,5-dimethylbenzene, 1-amino-2-ethylbenzene, 1-amino-3-ethylbenzene, 1-amino-4-ethylbenzene, 1-amino-2-methoxylbenzene, 1-amino-3-methoxylbenzene, 1-amino-4-methoxylbenzene, 1-amino-2-ethoxylbenzene, 1-amino-3ethoxylbenzene, 1-amino-4-ethoxylbenzene, 1-amino-2-chlorobenzene, 1-amino-3-chlorobenzene, 1-amino-4-chlorobenzene, 3-aminophenylmethane sulfonic acid, 4-aminophenylmethane sulfonic acid, 2-aminobenzene sulfonic acid, 3-aminobenzene sulfonic acid, 4-aminobenzene sulfonic acid, 3-methylaminobenzene sulfonic acid, 3-ethylaminobenzene sulfonic acid, 4-methylaminobenzene sulfonic acid, 4-ethylaminobenzene sulfonic acid, 5 -aminobenzene-1,3-disulfonic acid, 6-aminobenzene-1,3-disulfonic acid, 2-aminobenzene-1,4-disulfonic acid, 4-aminobenzene-1,2-disulfonic acid, 4-amino-5-methylbenzene-2-disulfonic acid, 2-, 3- or 4-aminobenzoic acid, 5 -aminobenzene-1,3-dicarboxylic acid, 5-amino-2-hydroxybenzene sulfonic acid, 4-amino-2-hydroxybenzene sulfonic acid, 5-amino-2-ethoxybenzene sulfonic acid, N-methylaminobenzene, N-ethylaminobenzene, 1-methylamino-3-methylbenzene, 1-methylamino-4-methylbenzene, 1-ethylamino-4-chlorobenzene, 1-ethylamino-3-methylbenzene, 1-ethylamino-4-methylbenzene, 1-(2-hydroxyethyl)amino-3-methylbenzene, 3or 4-methylbenzoic acid, 3- or 4-methylaminobenzene sulfonic acid, 2-, 4-, 5-, 6-, 7-, or 8-aminonaphthalene-1-sulfonic acid, 1-, 4-, 5-, 6-, 7- or 8-aminonaphthalene-2-sulfonic acid, 7-methylaminonaphthalene-2-sulfonic acid, 7 -ethylaminonaphthalene-2-sulfonic acid, 7-butylaminonaphthale ne-2-sulfonic acid, 7-isobutylaminonaphthalene-2-sulfonic acid, 4-, 5-, 6-, 7- or 8-aminonaphthalene-1,3-disulfonic acid, 2-, 3- or 4-aminonaphthalene-1,5-disulfonic acid, 4- or 8-aminonaphthalene-1,6-disulfonic acid, 4 -aminonaphthalene-1,7-disulfonic acid, 3- or 4 -aminonaphthalene-2,6-disulfonic acid, 3- or 4 -aminonaphthalene-2,7-disulfonic acid, 6- or 7-aminonaphthalene-1,3,5-trisulfonic acid, 4-, 7- or 8 -aminonaphthalene-1,3,6-trisulfonic acid and 4 -aminonaphthalene-1,3,7-trisulfonic acid; and aliphatic amines such as methylamine, ethylamine, n-propylamine, isopropylamine, n-butylamine, isobutylamine, sec-butylamine, dimethylamine, diethylamine, methylethylamine, 2-chloroethylamine, 2-methoxyethylamine, 2-aminoethanol, 2-methylaminoethanol, bis(2-hydroxyethyl) amine, 2-acetylethylamine, 1-amino-2-propanol, 3-methoxypropylamine, 2-aminoethanesulfonic acid, aminomethane sulfonic acid, 2-methylaminoethane sulfonic acid, 3 -amino-1-propane sulfonic acid, amino acetic acid, methylamino acetic acid, ε-alanine, β-aminocapronic acid, benzylamine, 2-, 3- or 4-chlorobenzylamine, 4-methylbenzylamine, N-methylbenzylamine, 2-, 3- or 4-sulfobenzylamine, 2-phenylethylamine, 1-phenylethylamine, 1-phenyl-2-propylamine, N,N-dimethyl-1,3-propanediamine, N,N-diethyl-1,3-propanediamine and N,N-di-n-butyl-1,3-propanediamine.

N,N-diethyl-1,3-propanediamine is particularly preferred as the compound of the formula(5-d).

Examples of the compounds represented by the formula(5-e) include morpholine, piperazine, piperidine and pyrrolidine.

As a particularly preferred example of the diaminodiphenylamine compound of the formula(6), 4,4' -diaminodiphenylamine-2-sulfonic acid can be mentioned.

Examples of the aminonaphthol compound represented by the formula(7) include 1-amino-8-naphthol-4-sulfonic acid, 1-amino-8-naphthol-3,6-disulfonic acid and 1-amino-8 -naphthol-4,6-disulfonic acid.

Examples of the aromatic compound represented by the formula(8) include aniline and its derivatives, phenol and its derivatives, amino phenol and its derivatives, naphthol and its derivatives, naphthoic acid and its derivatives, naphthylamine sulfonic acid and its derivatives and naphthol sulfonic acid and its derivatives.

Among them, preferable is phenol, 1-hydroxy-2-methylbenzene, 1-hydroxy-3-methylbenzene, 1-hydroxy-4-methylbenzene, 1,3-dihydroxybenzene, 1-hydroxy-3-methoxylbenzene, 1-hydroxy-3-aminobenzene, 3-di(β -hydroxyethyl)amino-1-hydroxybenzene, 1-di(β-hydroxyethyl) aminobenzene, 1,3-diamino-4-methylbenzene, 1-hydroxy-2-benzoic acid, 1,3-diaminobenzene-6-sulfonic acid, 1-acetylamino- 4-methoxy-3-di(β-hydroxyethyl)aminobenzene, 3 -diethylamino-1-hydroxybenzene, 1-hydroxynaphthalene, 1 -hydroxy-2-naphthoic acid, 1-hydroxynaphthalene-4-sulfonic acid, 1-hydroxynaphthalene-5-sulfonic acid, 1-hydroxynaphthalene-3-sulfonic acid, 1-hydroxynaphthalene-3,8-disulfonic acid, 1-hydroxynaphthalene-3,6-disulfonic acid, 1-hydroxynaphthalene-3,6,8-trisulfonic acid, 2-hydroxynaphthalene, 2-hydroxy-3-naphthoic acid, 2 -hydroxynaphthalene-8-sulfonic acid, 2-hydroxynaphthalene-7-sulfonic acid, 2-hydroxynaphthalene-6-sulfonic acid, 2 -hydroxynaphthalene-6,8-disulfonic acid, 2-hydroxynaphthalene- 3,6-disulfonic acid, 2-amino-8-hydroxynaphthalene-6-sulfonic acid, 2-methylamino-8-hydroxynaphthalene-6-sulfonic acid, 2-ethylamino-8-hydroxynaphthalene-6-sulfonic acid, 2-acetylamino-8-hydroxynaphthalene-6-sulfonic acid, 2-propionylamino-8-hydroxynaphthalene-6-sulfonic acid, 2 -benzoylamino-8-hydroxynaphthalene-6-sulfonic acid, 2 -carbamoylamino-8-hydroxynaphthalene-6-sulfonic acid, 2 -sulfamoylamino-8-hydroxynaphthalene-6-sulfonic acid, 2 -phenylamino-8-hydroxynaphthalene-6-sulfonic acid, 3-amino-8-hydroxynaphthalene-6-sulfonic acid, 3-methylamino-8 -hydroxynaphthalene-6-sulfonic acid, 3-ethylamino-8 -hydroxynaphthalene-6-sulfonic acid, 3-acetylamino-8 -hydroxynaphthalene-6-sulfonic acid, 3-propionylamino-8 -hydroxynaphthalene-6-sulfonic acid, 3-benzoylamino-8 -hydroxynaphthalene-6-sulfonic acid, 3-carbamoylamino-8 -hydroxynaphthalene-6-sulfonic acid, 3-sulfamoylamino-8 -hydroxynaphthalene-6-sulfonic acid, 3-phenylamino-8 -hydroxynaphthalene-6-sulfonic acid, 1-amino-8-hydroxynaphthalene- 3,6-disulfonic acid, 1-acetylamino-8 -hydroxynaphthalene-3,6-disulfonic acid, 1-amino-8-hydroxynaphthalene- 4,6-disulfonic acid, 1-acetylamino-8 -hydroxynaphthalene-4,6-disulfonic acid, 1-amino-8 -hydroxynaphthalene-2,4-disulfonic acid and dihydroxynaphthalene-3,6-disulfonic acid, and particularly preferable is 1-hydroxy-3-aminobenzene, The trisazo compound of the present invention is usable either singly or in the form of a mixture for dyeing or printing fiber material having hydroxy and/or amino group, paper or leather. It is particularly useful for dyeing and printing cellulose fiber such as rayon or cotton, paper, leather, silk or synthetic polyamide. The dyeing can be carried out by various dyeing processes such as the exhaustion dyeing process. Since the trisazo compound of the present invention exhibits a good solubility as well as a high fixation property, it can give a deep black colored dyed propduct. Particularly when used for dyelog paper, it exhibits a good build-up property and gives a dyed product of excellent fastness.

Further the trisazo compound of the present invention is usable either singly or in the form of a mixture as a dye for an ink applicable to ink-jet printers utilizing piezoelectric vibrator or thermal energy. Further, if necessary, it can be used in combination with a compound conventionally used for the ink-jet process which includes, for example, known dyes such as C.I. direct black 154.

The ink for which the trisazo compound is particularly useful is an aqueous ink, which is a composition further comprising a water-soluble organic solvent and water. As the examples of the water-soluble organic solvent usable for the aqueous ink, $C_1$–$C_4$ alkanols such as methanol, ethanol, n-propanol, isopropanol, n-butanol, sec-butanol, tert-butanol, iso-butanol or benzyl alcohol; amides such as dimethylformamide or diethylformamide; ketones and ketone alcohols such as acetone or diacetonealcohol; ethers such as tetrahydrofuran or dioxane; polyalkylene glycols such as polyethylene glycol or polypropylene glycol; alkylene glycols and thioglycols having $C_2$–$C_6$ alkylene such as ethylene glycol, propylene glycol, burylone glycol, triethylene glycol, thiodiglycol, hexylene glycol or diethylene glycol; other polyols such as glycerol or 1,2,6-hexanetriol; lower alkyl ethers of polyhydric alcohols such as 2-methoxy ethanol, 2-(2-methoxyethoxy)ethanol, 2-ethoxy ethanol, 2-(2-ethoxyethoxy) ethanol, 2-[2(2-methoxyethoxy)ethoxy]ethanol or 2-[2-(2-ethoxyethoxy)ethoxy]ethanol; alkanol amines such as monoethanolamine, diethanolamine or triethanolamine; and N-containing heterocyclic ketones such as 2-pyrrolidone, N-methyl-2-pyrrolidone, N-ethyl-2-pyrrolidone, N-vinylpyrrolidone, N-octyl-2-pyrrolidone, N-(2-hydroxyethyl)-2-pyrrolidone, N-cyclohexyl-2-pyrrolidone, N-dodecyl-2-pyrrolidone, N-isopropyl-2-pyrrolidone, N-n-butyl-2-pyrrolidone, N-tert-butyl-2-pyrrolidone, N-hexyl-2-pyrrolidone, N-(3-hydroxypropyl)-2-pyrrolidone, N-(2-methoxyethyl)-2-pyrrolidone, N-(2-methoxypropyl)-2-pyrrolidone, N-benzyl-2-pyrrolidone, polyvinylpyrrolidone or 1,3-dimethyl-2-imidizolidinone can be referred to. The water-soluble organic solvent can be used either singly or in the form of a mixture of two or more kinds of the solvent as long as they cause no adverse influence one another.

The trisazo compound represented by the formula(1) from which salts were removed is usually preferred as the dye for ink. The salts contained in the compound can be removed, for example, by precipitation in a mixed solvent of water and alcohol or by using ultrafiltration or reverce osmosis.

The amount of the trisazo compound is usually from 0.5 to 20 parts by weight, preferably from 1 to 15 parts by weight, based on 100 parts by weight of the ink.

solution strongly acidic and heating the reaction solution at 90° C., the hydrolysis of the acetyl group was conducted to obtain an amine compound.

The amine compound was diazotized according to a conventional method to obtain a diazonium compound(A).

27.9 Parts of 4,4'-diaminodiphenylamine-2-sulfonic acid were tetrazotized in a conventional manner and the tetrazonium compound thus obtained was coupled with 31.9 parts of 1-amino-8-naphthol-3,6-disulfonic acid at 0°–5° C. under acidic conditions. Then, 10.9 parts of 1-hydroxy-3-aminobenzene were added thereto and the coupling reaction was completed under weakly acidic conditions to obtain disazo compound(B).

The disazo compound(B) was coupled with the diazonium compound(A) under weakly acidic conditions. Then the resulting product was salted out in a conventional manner and the precipitated product was filtered. The precipitated product thus obtained was dissolved in water and the salt contained in the product was removed. The resulting product was dried to obtain a trisazo coumpound represented by the following formula in the free acid form.

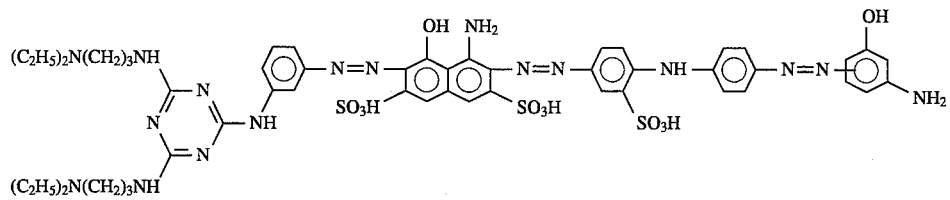

A rotproofing or mildewproofing agent such as sodium dehydroacetate as well as other various additives such as an ultraviolet absorber, infrared red absorber, viscosity regulator, surface tension regulator, pH regulator, resistivity regulator or penetrant may be added to the aqueous ink.

The aqueous ink can be easily prepared by dissolving the trisazo compound of the formula(1), a water-soluble organic solvent and various additives in cold or warm water, followed by, without cooling or after cooling, filtering the resulting solution through a membrane filter having very fine pore size.

The trisazo coumpound of the present invention is excellent in solubility. Accordingly it is good in storage stability and free from clogging of a nozzle caused by deposition. Further, the ink using the trisazo coumpound of the present invention gives a deep black-colored prited image excellent in clarity, water resistance and light fastness.

The present invention is now illustrated in more detail by the following examples, which are only illustrative and never construed to limit the invention. In the examples, "part" means "part by weight".

EXAMPLE 1

8,4 Parts of 2,4,6-trichloro-s-triazine were dissolved in 150 parts or acetone at 0°–5° C. To the solution, 15.0 parts of 1-amino-3-acetylaminobenzene were added and then 5.3 parts of sodium carbonate were added to conduct a condensation reaction. The resulting reaction solution was poured into 200 parts of water to precipitate a crystalline product and the crystalline product was filtered. Then, the crystalline product thus obtained was dispersed in 500 parts of water and 39.1 parts of N,N-diethyl-1,3-propanediamine were added thereto to conduct the reaction for 5 hours at 70°. Then, by adding hydrochloric acid to make the reaction Measured in an aqueous medium, $\lambda_{max}$, of this trisazo coumpound was 630 nm.

EXAMPLE 2

18.4 Parts of 2,4,6-trichloro-s-triazine were dissolved in 150 parts of acetone at 0°–5° C. To the solution, 13.8 parts of 4-nitroaniline were added and then 5.3 parts of sodium carbonate were added to conduct a condensation reaction. The resulting reaction solution was poured into 200 parts of water to precipitate a crystalline product and the crystalline product was filtered. Then, the crystalline product thus obtained was dispersed in 500 parts of water and 39.1 parts of N,N-diethyl-1,3-propanediamine were added thereto to conduct a reaction for 1 hour at 95° C. Then, by adding iron powder, the reduction of the nitro group was conducted according to a conventional manner to obtain an amine compound.

The amine compound was diazotized according to a conventional method to obtain a diazonium compound(C), 27.9 Parts of 4,4'-diaminodiphenylamine-2-sulfonic acid were tetrazotized in a conventional manner and the tetrazonium compound thus obtained was coupled with parts of 1-amino-8-naphthol-3,6-disulfonic acid at 0°–5° C. under acidic conditions. The diazonium compound(C) was added thereto to conduct a coupling reaction under weakly acidic conditions at 0°–10° C. Further, 10.9 parts of 1-hydroxy-3-aminobenzene were added thereto and the coupling reaction was completed under weakly acidic conditions.

Then, the resulting product was salted out in a conventional manner and the precipitated product was filtered. The precipitated product thus obtained was dissolved in water and the salt contained in the product was removed. The resulting product was dried to obtain a trisazo coumpound represented by the following formula in the free acid form.

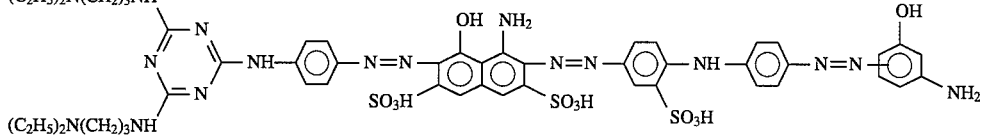

Measured in an aqueous medium, $\lambda_{max}$, of this trisazo coumpound was 645 nm.

EXAMPLE 3

18.4 Parts of 2,4,6-trichloro-s-triazine were dispersed in 150 parts of water at 0°–5° C. To the dispersion, 18.8 parts of 1,3-diaminobenzene-4-sulfonic acid were added to conduct a condensation reaction under acidic conditions. To the resulting reaction mass, 39.1 parts of N,N-diethyl-1,3-propanediamine were added and the reaction mass was made alkaline with sodium hydroxide and then the temperature was raised to 70° C. and the reaction was carried out at that temperature for 7 hours to obtain an amine compound. The amine compound was diazotized according to a conventional method to obtain a diazonium compound(D).

27.9 Parts of 4,4'-diaminodiphenylamine-2-sulfonic acid were tetrazotized in a conventional manner and the tetrazonium compound thus obtained was coupled with 31.9 parts of 1-amino-8-naphthol-3,6-disulfonic acid at 0°–5° C. under acidic conditions. Then, 10.9 parts of 1-hydroxy-3-aminobenzene were added to complete the coupling reaction under weakly acidic conditions to obtain a disazo compound(E).

The disazo compound(E) was coupled with the diazonium compound(D) under weakly acidic conditions. Then the resulting product was salted out in a conventional manner and the precipitated product was filtered. The precipitated product thus obtained was dissolved in water and the salt contained in the product was removed. The resulting product was dried to obtain a trisazo coumpound represented by the following formula in the free acid form.

was conducted for 7 hours at that temperature. Then, by adding hydrochloric acid to make the reaction mass strongly acidic and heating the mass at 90° C., the hydrolysis of the acetyl group was conducted to obtain an amine compound.

The amine compound was diazotized according to a conventional method to obtain a diazonium compound(F).

27,9 Parts of 4,4'-diaminodiphenylamine-2-sulfonic acid was tetrazotized in a conventional manner and the tetrazonium compound thus obtained was coupled with 31.9 parts of 1-amino-8-naphthol-3,6-disulfonic acid at 0°–5° C. under acidic conditions. Then, 10.9 parts of 1-hydroxy-3-aminobenzene were added thereto and the coupling reaction was completed under weakly acidic conditions to obtain disazo compound(G).

The disazo compound(G) was coupled with the diazonium compound(F) under weakly acidic conditions. Then the resulting product was precipitated by acid in a conventional manner and the precipitated product was filtered. The precipitated product thus obtained was dispersed in water and aqueous ammonia solution was added to make the dispersion weakly alkaline and the salt contained in the product was removed. The resulting product was dried to obtain an ammonium salt of a trisazo coumpound represented by the following formula.

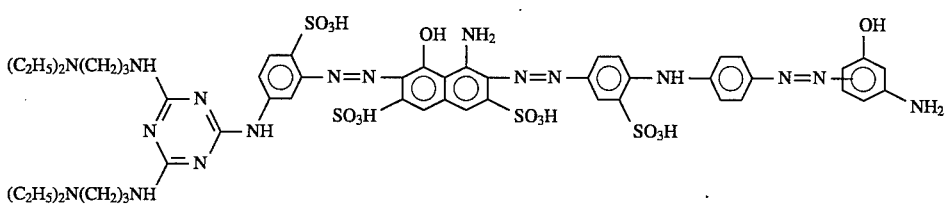

Measured in an aqueous medium, $\lambda_{max}$, of this trisazo coumpound was 625 nm.

EXAMPLE 4

18.4 Parts of 2,4,6-trichloro-s-triazine were dissolved into 150 parts of acetone at 0°–5° C. To the solution, 15.0 parts of 1-amino-3-acetylaminobenzene were added and then 5.3 parts of sodium carbonate were added to conduct a condensation reaction. The resulting reaction solution was poured into 200 parts of water to precipitate a crystalline product and the crystalline product was filtered. Then, the crystalline product thus obtained was dispersed in 500 parts of water and 26.7 parts of β-alanine were added thereto and the reaction mass was made alkaline with sodium hydroxide and then the temperature was raised to 70° C. and the reaction

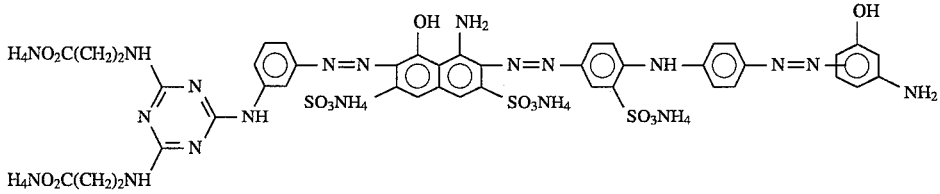

Measured in an aqueous medium, $\lambda_{max}$, of this trisazo coumpound was 625 nm.

EXAMPLE 5

Into 500 parts of an LBKP 20 g/L pulp dispersion having been beaten up to a degree of beating of CFS 400 ml, 0.8 part of the trisazo coumpound obtained in Example 1 was added. After agitating the mixture for 10 minutes, 0.3 part of Sizepine E (sizing agent manufactured by Arakawa Chemical Industry, Co.) was added and the resulting mixture wee agitated for 10 minutes. Thereafter, 0.3 part of crystalline aluminum sulfate was added thereto and the resulting mixture was agitated for 20 minutes to carry out dyeing. Then, the dyed pulp was made into paper and dried. The paper thus prepared had a deep black color tone and an excellent fastness.

EXAMPLE 6

A composition of the following formulation was heated at about 70° C., adjusted the pH at 10 with sodium hydroxide and agitated to form a solution. Then the solution was filtered through a Teflon filter having a pore diameter of 0.45 μm to prepare an ink.

| | |
|---|---|
| Trisazo compound obtained in Example 1 | 2 parts |
| Glycerine | 4 parts |
| 2-pyrrolidone | 10 parts |
| ethanol | 4 parts |
| 4-chloro-3-methylphenol | 0.01 part |
| Deionized water | 80 parts |

Using the ink thus obtained, an ink jet recording was carried out on a commercially available high quality paper by a ink-jet recording apparatus equipped with an On-Demand type recording head which jets ink by a piezoelectric vibrator. No clogging of the nozzle took place even after recording for a long period of time. The image thus formed was excellent in water resistance, light fastness, color depth and clarity.

EXAMPLE 7

Example 1 was repeated, except that 1-amino-8-naphthol-4,6-disulfonic acid was used instead of 1-amino-8-naphthol-3,6-disulfonic acid to obtain a trisazo coumpound represented by the following formula.

Measured in an aqueous medium, $\lambda_{max}$, of this trisazo compound was 620 nm.

EXAMPLE 8

18.4 Parts of 2,4,6-trichloro-s-triazine were dispersed in 150 parts of water at 0°–5° C. To the dispersion, 18,8 parts of 1,3-diaminobenzene-4-sulfonic acid were added to conduct a condensation reaction under acidic conditions. To the resulting reaction mass, 8.9 parts of β-alanine were added, then the solution was neutralized with sodium carbonate and a reaction was carried out at 20° C. Then, 3.0 parts of N,N-diethyl-1,3-propanediamine were added thereto and the reaction mass was made alkaline with sodium hydroxide, the temperature was raised to 70° C. and the reaction was carried out for 5 hours at that temperature to obtain an amine compound.

The amine compound was diazotized according to a conventional method to obtain a diazonium compound(H).

27.9 Parts of 4,4'-diaminodiphenylamine-2-sulfonic acid were tetrazotized in a conventional manner and the tetrazonium compound thus obtained was coupled with 31.9 parts of 1-amino-8-naphthol-3,6-disulfonic acid at 0°–5° C. under acidic conditions. Then, 11.0 parts of 1,3dihydroxybenzene were added to complete the coupling reaction under weakly acidic conditions to obtain a disazo compound(I).

The disazo compound(I) was coupled with the diazonium compound(H) under weakly acidic conditions. Then the resulting product was salted out in a conventional manner and the precipitated product was filtered. The precipitated product thus obtained was dissolved in water and the salt contained in the product was removed. The resulting product was dried to obtain a trisazo coumpound represented by the following formula in the free acid form.

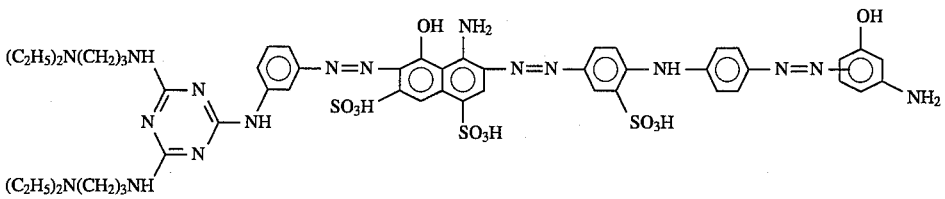

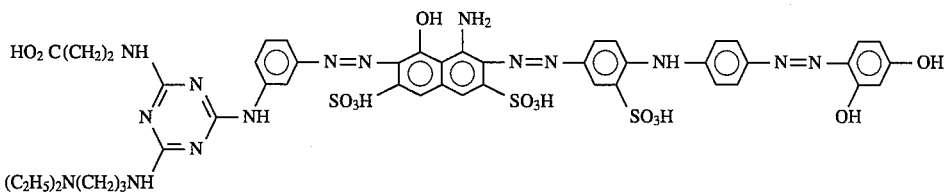

Measured in an aqueous medium, $\lambda_{max}$, of this trisazo coumpound was 625 nm.

EXAMPLE 9

Example 1, 2 or 8 was repeated, except that 1,3-diaminobenzene-4-sulfonic acid, β-alanine, N,N-diethyl-1,3-propanediamine and 1,3-dihydroxybenzene were replaced by the compound(5-a) shown in column 2 of the following Table, the compound(5-b)–(5-e) shown in column 3 of the following Table, the compound(5-b)–(5-e) shown in column 4 of the following Table and the compound(8) shown in column 5 of the following Table, respectively, to obtain corresponding trisazo coumpounds, Then, Example 5 was repeated except that each of the trisazo coumpounds obtained in this example was used instead of the trisazo compound obtained in Example 1. The color tones of the dyed products thus obtained are shown in column 6 of the following Table.

| Exp. No. | Compound of the formula (5-a) | Compound of the formula (5-b)-(5-e) | Compound of the formula (5-b)-(5-e) | Compound of the formula (8) | Color tone |
|---|---|---|---|---|---|
| 1 | 3-nitroaniline | NH$_2$CH$_2$CH$_2$SO$_3$H | NH$_2$CH$_2$CH$_2$SO$_3$H | 3-aminophenol | Black |
| 2 | " | NH$_2$CH$_2$CH$_2$OH | " | " | Black |
| 3 | 3-(acetylamino)aniline (NHCO–CH$_3$) | 4-aminobenzenesulfonic acid (SO$_3$H, NH$_2$) | 5-aminoisophthalic acid (COOH, COOH, NH$_2$) | resorcinol (1,3-dihydroxybenzene) | Greenish Black |
| 4 | 2,4-diaminobenzenesulfonic acid (NH$_2$, SO$_3$H, NH$_2$) | 4-aminobenzoic acid (COOH, NH$_2$) | 4-aminobenzoic acid (COOH, NH$_2$) | 3-aminophenol | Black |
| 5 | " | 2,5-diaminobenzenesulfonic acid (SO$_3$H, SO$_3$H, NH$_2$) | N-ethyl-4-chloroaniline (Cl, NH–C$_2$H$_5$) | 3-(diethylamino)phenol (N(C$_2$H$_5$)$_2$, OH) | Purplish Black |
| 6 | " | 2-amino-4-methoxybenzenesulfonic acid (OCH$_3$, SO$_3$H, NH$_2$) | piperidine (HN) | 2,4-diamino-benzenesulfonic acid (SO$_3$H, NH$_2$, NH$_2$) | Greenish Black |

-continued

| Exp. No. | Compound of the formula (5-a) | Compound of the formula (5-b)-(5-e) | Compound of the formula (5-b)-(5-e) | Compound of the formula (8) | Color tone |
|---|---|---|---|---|---|
| 7 | 3-nitroaniline (NO₂, NH₂ on benzene) | 2-aminobenzene-1,4-disulfonic acid derivative (SO₃H, NH₂, SO₃H) | N-methyl-o-toluidine (CH₃, NH-) | 1-hydroxy-6-(methylamino)naphthalene-3-sulfonic acid (OH, SO₃H, NHCH₃) | Purplish Black |
| 8 | 3-nitroaniline (NH₂, NO₂) | NH₂CH₂CH₂COOH | NH₂CH₂CH₂COOH | 1-hydroxy-2-naphthoic acid (COOH, OH) | Greenish Black |
| 9 | 4-amino-3-carboxyacetanilide (NHCO—CH₃, COOH, NH₂) | " | " | 3-aminophenol (NH₂, OH) | Black |
| 10 | 2-amino-4-aminobenzenesulfonic acid (NH₃, SO₃H, NH₂) | " | " | " | Black |
| 11 | 2-methoxy-5-nitroaniline (NO₂, OCH₃, NH₂) | 2-aminobenzene-1,4-disulfonic acid (SO₃H, NH₂, SO₃H) | benzylamine (NH₂CH₂—) | m-phenylenediamine (NH₂, NH₂) | Purplish Black |

-continued
| Exp. No. | Compound of the formula (5-a) | Compound of the formula (5-b)-(5-e) | Compound of the formula (5-b)-(5-e) | Compound of the formula (8) | Color tone |
|---|---|---|---|---|---|
| 12 | 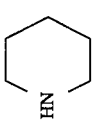 | 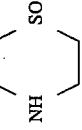 | 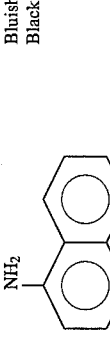 |  | Bluish Black |
| 13 |  | $NH_2(CH_2)_3N(C_2H_5)_2$ | $NH_2(CH_2)_3N(C_2H_5)_2$ |  | Black |
| 14 |  | " | " |  | Black |
| 15 | 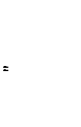 | $CH_3OH$ | $NH_3$ | 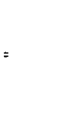 | Black |
| 16 | 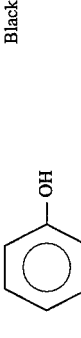 |  |  | " | Black |
| 17 |  | 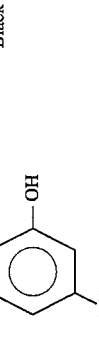 |  | 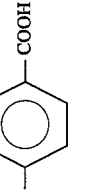 | Greenish Black |

-continued

| Exp. No. | Compound of the formula (5-a) | Compound of the formula (5-b)-(5-e) | Compound of the formula (5-b)-(5-e) | Compound of the formula (8) | Color tone |
|---|---|---|---|---|---|
| 18 | 3-nitroaniline (NO$_2$, NH$_2$ on benzene) | 2-amino-naphthalene-5,7-disulfonic acid (naphthalene with SO$_3$H, SO$_3$H, NH$_2$) | 4-hydroxybenzoic acid (HO–C$_6$H$_4$–COOH) | 2-amino-4-methoxy-5-methyl... (benzene with OCH$_3$, NH$_2$, CH$_3$) | Purplish Black |
| 19 | 3-amino-acetanilide (NH$_2$, NHCOCH$_3$ on benzene) | NH$_2$(CH$_2$)$_3$N(C$_2$H$_5$)$_2$ | NHCH$_2$CH$_2$OH | 3-aminophenol (OH, NH$_2$ on benzene) | Black |
| 20 | 2,5-diamino-benzenesulfonic acid (NH$_2$, SO$_3$H, NH$_2$ on benzene) | NH$_2$CH$_2$CH$_2$OH | NH$_2$CH$_2$CH$_2$OH | " | Black |
| 21 | " | NH$_2$CH$_2$CH$_2$OCH$_3$ | piperazine (HN–NH ring) | 1,3-diamino-4-sulfobenzene (SO$_3$H, NH$_2$, NH$_2$ on benzene) | Greenish Black |
| 22 | 3-amino-acetanilide (NH$_2$, NHCOCH$_3$ on benzene) | NH$_2$(CH$_2$)$_3$N(C$_4$H$_9$)$_2$ | NH$_2$(CH$_2$)$_3$N(C$_4$H$_9$)$_2$ | 3-aminophenol (OH, NH$_2$ on benzene) | Black |

EXAMPLE 10

A composition of the following formulation was adjusted at pH 9 with aqueous ammonia solution and the composition was agitated to form a solution. Then the solution was filtered through a Teflon filter having a pore diameter of 0.45 μm to prepare ink. Using the ink thus obtained, ink-jet printing was conducted according to the same manner as in Example 6 and similar results to those of Example 6 were obtained.

| Trisazo compound obtained in Example 4 | 3 parts |
|---|---|
| Deionized water | 84 parts |
| Diethylene glycol | 10 parts |
| Glycerine | 3 parts |
| Sodium dehydroacetate | 0.01 part |

EXAMPLE 11

A composition of the following formulation was heated at about 50° C. with agitation to form a solution. Then, the solution was filtered through a Teflon filter having a pore diameter of 0.45 μm to prepare an ink.

| Trisazo compound obtained in No. 1 of Example 9 | 5 parts |
|---|---|
| Deionized water | 90 parts |
| Diethylene glycol | 5 parts |
| Sodium dehydroacetate | 0.01 part |

The ink thus prepared was sealed in a glass container and left standing for a long period of time at temperatures of 20° C. and 50° C., After standing, the recording liquid showed no deposition of crystalline matter and demonstrated a high stability of its quality.

Using the ink thus obtained, an ink-jet recording was carried out on a commercially available high quality paper by a so-called bubble jet type recording apparatus which jets ink by the action of thermal energy. No clogging of the nozzle took place even after the recording for a long period of time. The image thus formed was excellent in water resistance, light fastness, color depth and clarity.

EXAMPLE 12

An ink was prepared from a composition of the following formulation and ink-jet printing was carried out according to the same manner as in Example 11. Similar results to those of Example 11 were obtained.

| Trisazo compound obtained in No. 10 of Example 9 | 3 parts |
|---|---|
| Deionized water | 84 parts |
| Diethylene glycol | 10 parts |
| Glycerine | 3 parts |
| Sodium dehydroacetate | 0.01 part |

The trisazo coumpound of the present invention is good in solubility and the ink containing the trisazo coumpound is excellent in storage stability, Using the trisazo coumpound for dyeing or printing, a clear and deep colored dyeing product or recording image having excellent water resistance, light fastness can be obtained. Thus, the trisazo coumpound of the present invention exhibits various excellent properties as a dye for dyeing and ink.

What we claim are:

1. A trisazo compound represented by the following formula (1) in the free acid form:

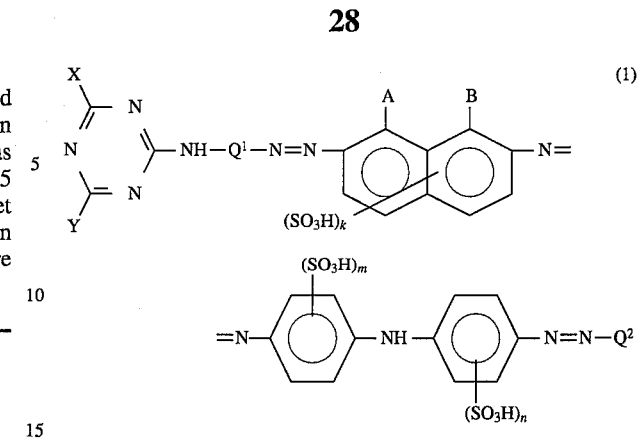

wherein $Q^1$ is phenylene group which may be optionally substituted; $Q^2$ is phenyl or naphtyl group which may be optionally substituted; one of A and B is a hydroxy group and the other is an amino group; K is 1 or 2; one of m and n is 1 and the other is 0; X and Y independently of one another are each $-OR^1$, $-SR^2$, $-NR^3R^4$ or

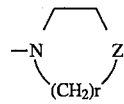

wherein $R^1$, $R^2$, $R^3$ and $R^4$ independently of one another are each a hydrogen atom, an alkyl, phenyl or naphthyl group which may be optionally substituted; r is 1 or 2; and Z is $-CH_2-$, $-O-$, $-SO_2-$ or $-NR^5-$ wherein $R^5$ is a hydrogen atom or $C_1-C_4$ alkyl group.

2. The trisazo compound according to claim 1, wherein $Q^1$ is an unsubstituted phenylene group or a phenylene group substituted by an alkyl, alkoxy, sulfo or carboxy group.

3. The trisazo compound according to claim 1, wherein $Q^2$ is a phenyl group which is substituted by one, two or three hydroxy groups and may be further substituted by an amino group which may be optionally substituted, a sulfo, alkyl, alkoxy or carboxy group.

4. The trisazo compound according to claim 1, wherein $Q^2$ is a phenyl group which is substituted by one or two amino groups which may be optionally substituted, and may be further substituted by a hydroxy, sulfo, alkyl, alkoxy or carboxy group.

5. The trisazo compound according to claim 1, wherein $Q^2$ is 2-amino-4-hydroxyphenyl or 2-hydroxy-4-aminophenyl.

6. The trisazo compound according to claim 1, wherein $Q^2$ is a naphthyl group which is substituted by one or two hydroxy groups and may be further substituted by an amino group which may be optionally substituted, a sulfo or carboxy group.

7. The trisazo compound according to claim 1, wherein $Q^2$ is a naphthyl group which is substituted by one or two amino groups which may be optically substituted and may be further substituted by a hydroxy, sulfo or carboxy group.

8. The trisazo compound according to claim 1, wherein X and Y independently of one another are each $-OR^{11}$ or $-NR^{31}R^{41}$ wherein $R^{11}$ is an unsubstituted alkyl group having 1–4 carbon atoms; an alkyl group having 1–4 carbon atoms which is substituted by one or two substituents selected from alkoxy having 1–4 carbon atoms, sulfo, carboxy, hydroxy, phenyl, cyano and chloro; an unsubstituted phenyl group; or a phenyl group which is substituted by one or two substituents selected from alkyl having 1–4 carbon atoms, alkoxy having 1–4 carbon atoms, sulfo, carboxy and chloro; and $R^{31}$ and $R^{41}$ independently of one another are each a hydrogen atom; an unsubstituted alkyl group having 1–4 carbon atoms; an alkyl group having 1–4 carbon atoms which is substituted by one or two substituents selected from amino substituted by two alkyl groups having 1–4 carbon atom, alkoxy having 1–4 carbon atoms, sulfo, carboxy and hydroxy; an unsubstituted phenyl group; or a phenyl group which is substituted by one or two substituents selected from alkyl having 1–4 carbon atoms, alkoxy having 1–4 carbon atoms, sulfo, carboxy and chloro.

9. The trisazo compound according to claim 1, wherein at least one of X and Y is (a) an alkylamino group which has 1–4 carbon atoms and may be optionally substituted by one or two substituents selected from amino substituted by two alkyl groups having 1–4 carbon atoms, alkoxy having 1–4 carbon atoms, sulfo, carboxy and hydroxy or (b) an phenylamino group which may be optionally substituted by one or two substituents selected from alkyl having 1–4 carbon atoms, alkoxy having 1–4 carbon atoms, sulfo, carboxy and chloro.

10. The trisazo compound according to claim 1, wherein at least one of X and Y is —NH(CH$_2$)$_3$N(C$_2$H$_5$)$_2$.

11. A trisazo compound represented by the following formula (3) in the free acid form:

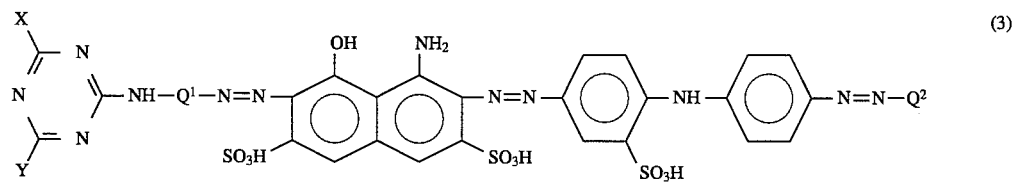

(3)

wherein $Q^1$, $Q^2$, X and Y are as defined in claim 1.

12. A trisazo compound represented by the following formula (4) in the free acid form:

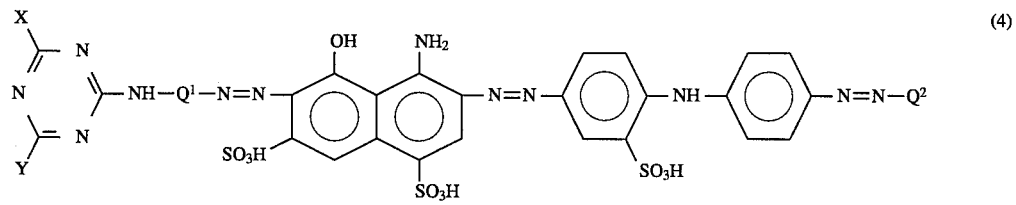

(4)

wherein $Q^1$, $Q^2$, X and Y are as defined in claim 1.

13. A method for dyeing fiber material, paper or leather by applying thereto the trisazo compound of claim 1.

14. An ink which contains the trisazo compound of claim 1.

15. The ink according to claim 14, which is for ink-jet printing.

* * * * *

UNITED STATES PATENT AND TRADEMARK OFFICE
CERTIFICATE OF CORRECTION

PATENT NO. : 5,489,671
DATED : Feb. 6, 1996
INVENTOR(S) : Kazuya OGINO et al

It is certified that error appears in the above-indentified patent and that said Letters Patent is hereby corrected as shown below:

TITLE PAGE:

[73] Replace "Sumitomo Chemical Company Limited, Osaka, Japan" with --Sumitomo Chemical Company, Limited, Osaka, Japan and Taoka Chemical Company, Limited, Osaka, Japan--.

Signed and Sealed this

Seventeenth Day of March, 1998

Attest:

BRUCE LEHMAN

Attesting Officer

Commissioner of Patents and Trademarks